No. 633,925. Patented Sept. 26, 1899.
A. SWASEY & W. M. ALLEN.
FRICTION CLUTCH.
(Application filed May 16, 1899.)
(No Model.)
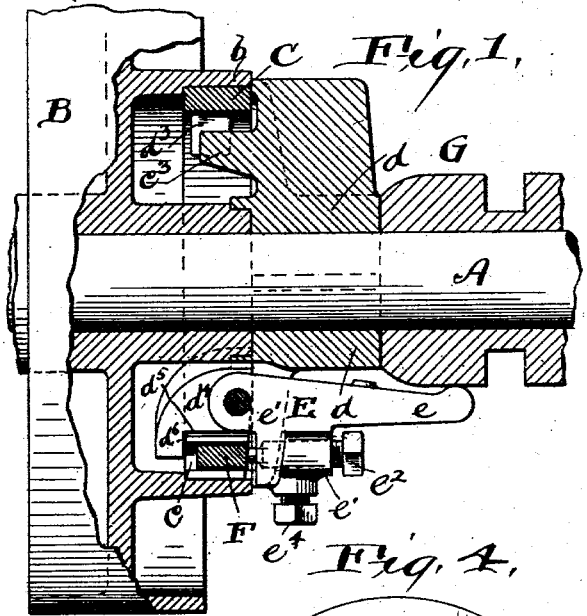
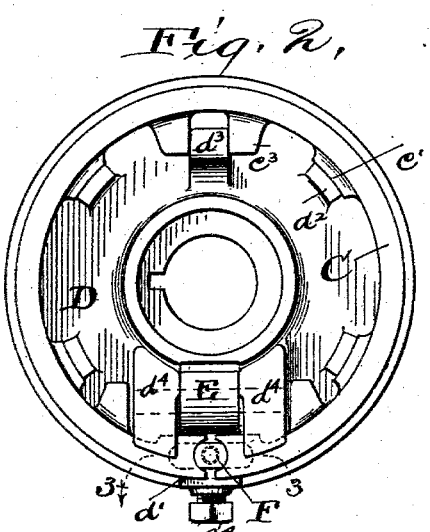
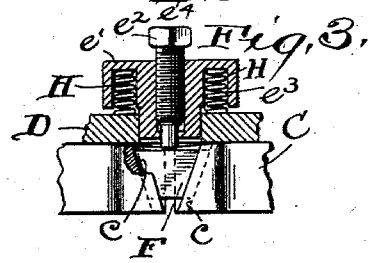
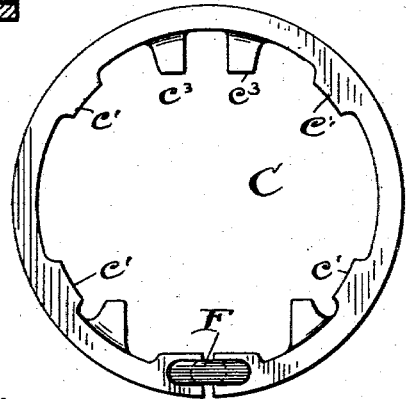
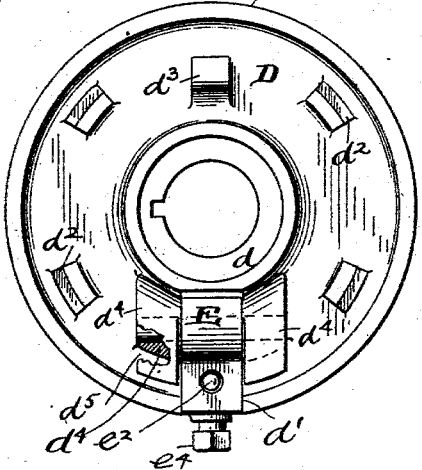
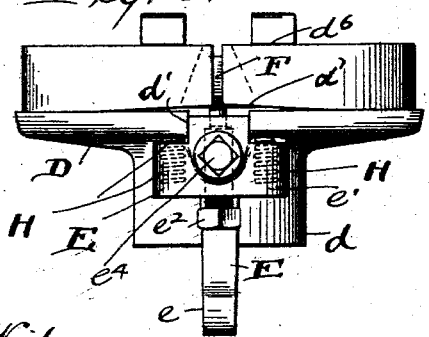
Witnesses,
E. B. Gilchrist
Philip E. Knowlton
Inventors,
Ambrose Swasey,
Walter M. Allen,
By their Attorneys,
Thurston & Bates.
THE NORRIS PETERS CO., PHOTO-LITHO., WASHINGTON, D. C.

UNITED STATES PATENT OFFICE.

AMBROSE SWASEY AND WALTER M. ALLEN, OF CLEVELAND, OHIO, ASSIGNORS TO WARNER & SWASEY, OF SAME PLACE.

FRICTION-CLUTCH.

SPECIFICATION forming part of Letters Patent No. 633,925, dated September 26, 1899.

Application filed May 16, 1899. Serial No. 717,034. (No model.)

*To all whom it may concern:*

Be it known that we, AMBROSE SWASEY and WALTER M. ALLEN, citizens of the United States, residing at Cleveland, in the county of Cuyahoga and State of Ohio, have invented a certain new and useful Improvement in Friction-Clutches, of which the following is a full, clear, and exact description, reference being had to the accompanying drawings.

Our invention relates to the class of friction-clutches which employ an expanding ring.

The invention, as shown, is designed with special reference to its use as a means for connecting and disconnecting a counter-shaft and a constantly-driven pulley loosely mounted thereon, but the invention is adapted for substantially all of the specific uses for which any friction-clutch is adapted.

The principal objects of the invention are simplicity and cheapness in the construction, certainty in operation, and the avoidance of end thrust in setting the clutch.

The invention consists in the construction and combinations of parts hereinafter described, and pointed out definitely in the claims.

In the drawings, Figure 1 is a side view, principally in section, of the clutch mechanism embodying our invention. Fig. 2 is a left end view of the carrier and the mechanism which it carries. Fig. 3 is a view, partly in section, of parts of the expanding ring, the operating-wedge, the carrier, and the lever which operates the wedge. Fig. 4 is a detached end view of the expanding ring. Fig. 5 is an end view of the carrier, and Fig. 6 an edge view of the carrier and the parts which it carries.

Referring to the parts by letters, A represents the shaft, and B a pulley which is independently rotatable and is mounted in the same axial line with the shaft. It is preferably loosely mounted upon the shaft. The shaft and the pulley are the two relatively rotatable parts which the clutch mechanism constituting our invention is designed to connect and disconnect. The pulley has an annular flange $b$, which is concentric with the axis of the shaft, and the expanding ring C lies within and is adapted to be expanded into contact with the inner periphery of this flange.

The ring C is supported by the carrier D, which is made fast to the shaft A. This carrier is in the form of a disk having a hub $d$, which embraces and is keyed to the shaft. The expanding ring C is a split ring. In the meeting edge of this ring are the tapered grooves $c\ c$, which together make a wedge-shaped recess, this recess being substantially at right angles to the radial line passing between the meeting edges of the ring. In this recess a wedge-faced block F is placed.

The wedge or block F may be forced forward—that is to say, toward the pulley—whereby the meeting edges of the ring are forced apart and the ring expanded into contact with the flange $b$ by a bell-crank lever E, which is pivoted to the carrier. One arm $e$ of this lever engages with the cone G, which loosely embraces and is adapted to be moved along that shaft A by a suitable mechanism. The other arm $e'$, which passes through the slot $d'$ in the carrier-disk, carries an adjustable screw $e^2$, (locked by the set-screws $e^4$,) the end of the screw $e^2$ engaging with the large end of the wedge.

Springs H H are placed in compression in recesses $e^3$ in the arm $e'$ and between said arm and the carrier-disk, and they act to move said lever E in the direction which relieves its pressure on the wedge. It will be noticed that the wedge in moving to expand the ring moves in a path parallel with the axis of the shaft, wherefore the centrifugal force generated by the rotation of the carrier will have no effect in moving the wedge to expand the ring or permit it to contract.

Upon the inner surface of the carrier are a plurality of centering-lugs $d^2$, with which the split ring or, rather, lugs $c'$ projecting inward from the ring engage, and the engagement of these lugs holds the ring in position when it is concentric with the shaft. A lug $d^3$ on the carrier enters between two lugs $c^3$ on the ring, whereby the ring and carrier are compelled to rotate together. Two arms $d^4$ project inward from the carrier on opposite sides of the slot $d'$, through which the operating-lever arm $e'$ projects. The outer faces of these arms are grooved and the expanding ring near its meeting ends lies in these grooves $d^5$. The forming of these grooves produces the shoulders $d^6$, which serve in a measure to hold the ring against the face of the carrier. Their principal function, however, is to receive the thrust due to the forcing of the wedge in between the meeting ends of the split ring for the purpose of expanding the ring. The carrier and the shoulders take the entire thrust incident to this motion because the lever is pivoted to the carrier, and by its action it moves the wedge and in so doing forces the ring against the shoulders $d^6$, which are likewise parts of the carrier.

That part of the split ring which engages with and is adjacent to the arms $d^4$ is beveled outward on its inner face—viz., the face which is next to the carrier—as shown at $d^7$. Because it is so beveled the parts may be assembled when the arms $d^4$, driving-lug $d^3$, and centering-lug $d^2$ are formed integral with the carrier. The part of the split ring which is beveled—that is to say, that part of its inner face which is adjacent to the split in said ring—is laid against the face of the carrier and that part of the ring is drawn under the shoulders $d^6$, the opposite side of said ring being at this time held far enough from the carrier so as not to touch the driving-lug $d^3$. When the ring is well under the shoulders $d^6$, the opposite side of said ring is pushed back against the carrier and into engagement with the centering-lugs and with the driving-lug.

Having described our invention, what we claim as new, and desire to secure by Letters Patent, is—

1. In a friction-clutch, the combination of a carrier having (1) centering-lugs, (2) a driving-lug, and (3) arms having the shoulders $d^6$, with a split ring which engages with the centering-lugs and lies between said shoulders and the carrier and has lugs which embrace the driving-lug, a wedge lying between the meeting ends of said ring, a lever pivoted to the carrier for actuating said wedge, and a sliding sleeve for operating said lever, substantially as specified.

2. In a friction-clutch, the combination of a carrier having the following integral parts: to wit, centering-lugs, a driving-lug, and an arm $d^4$ having shoulders $d^6$, with a split ring which embraces said centering-lugs and lies between said shoulders $d^6$ and the body of the carrier and has lugs which embrace the driving-lug on said carrier, that face of the ring which faces the carrier being beveled outward to its outer periphery on both sides of the split therein, and means for expanding said ring.

In testimony whereof we hereunto affix our signatures in the presence of two witnesses.

AMBROSE SWASEY.
WALTER M. ALLEN.

Witnesses:
WM. E. REID,
PHILIP E. KNOWLTON.